United States Patent [19]

Carter

[11] 4,219,266
[45] Aug. 26, 1980

[54] FILM CARTRIDGE

[75] Inventor: James P. Carter, Norristown, Pa.

[73] Assignee: J. P. Carter Co., Inc., Norristown, Pa.

[21] Appl. No.: 12

[22] Filed: Jan. 2, 1979

[51] Int. Cl.² .......................... G03B 1/18; G03B 1/24; G03B 17/26
[52] U.S. Cl. ................................. 354/275; 354/216; 242/71.1
[58] Field of Search .............. 354/275, 296, 216, 212; 242/71, 71.1

[56] References Cited

U.S. PATENT DOCUMENTS

| | | | |
|---|---|---|---|
| 461,306 | 10/1891 | Blair | 242/71.1 |
| 595,468 | 12/1897 | Cook | 354/275 X |
| 790,123 | 5/1905 | Hall | 354/275 X |
| 1,259,069 | 3/1918 | Bardsley | 354/279 X |
| 3,719,130 | 3/1973 | Scott | 354/216 |
| 4,034,388 | 7/1977 | Iwashita | 354/212 |

FOREIGN PATENT DOCUMENTS

| | | | |
|---|---|---|---|
| 817397 | 10/1951 | Fed. Rep. of Germany | 354/212 |
| 11055 | of 1885 | United Kingdom | 354/212 |
| 1086493 | 10/1967 | United Kingdom | 354/275 |

*Primary Examiner*—L. T. Hix
*Assistant Examiner*—Shelley Wade
*Attorney, Agent, or Firm*—Robert P. Seitter

[57] ABSTRACT

A film cartridge for use in cameras wherein a precise length of film is automatically fed across the shutter opening. The cartridge comprises a housing having a generally flat elongated portion and a generally cylindrical portion at one end of the flat portion. Inside the cylindrical portion are a film feed spool and a film take-up spool arranged in side-by-side relationship with driving means between them so that rotation of one spool automatically causes rotation of the other spool. At the other end of the flat portion is a roller arranged to cooperate with means for driving the film so that the film is pulled off of the feed spool causing that spool and the take-up spool to be driven. The take-up spool thus pulls the film and onto the take-up spool.

8 Claims, 4 Drawing Figures

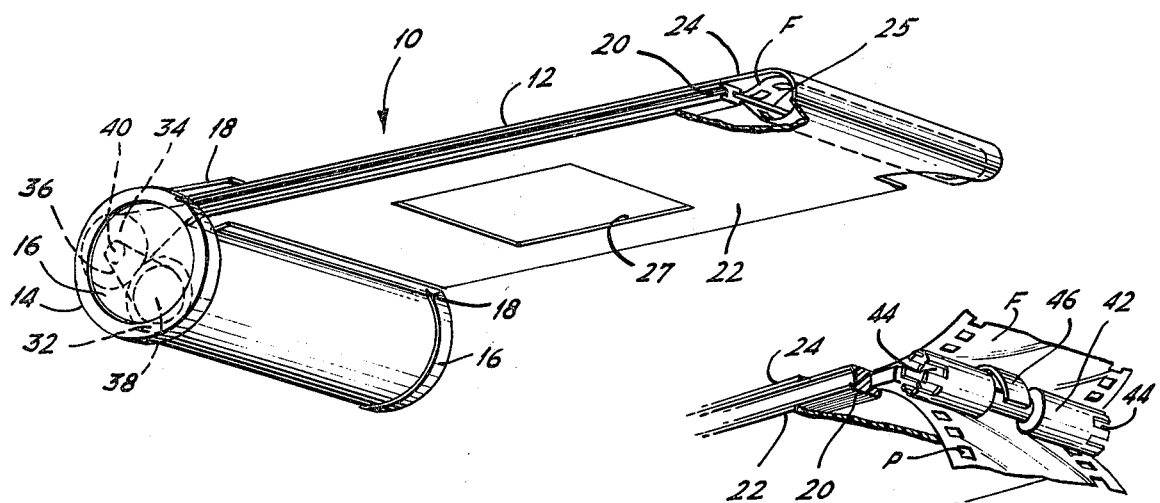
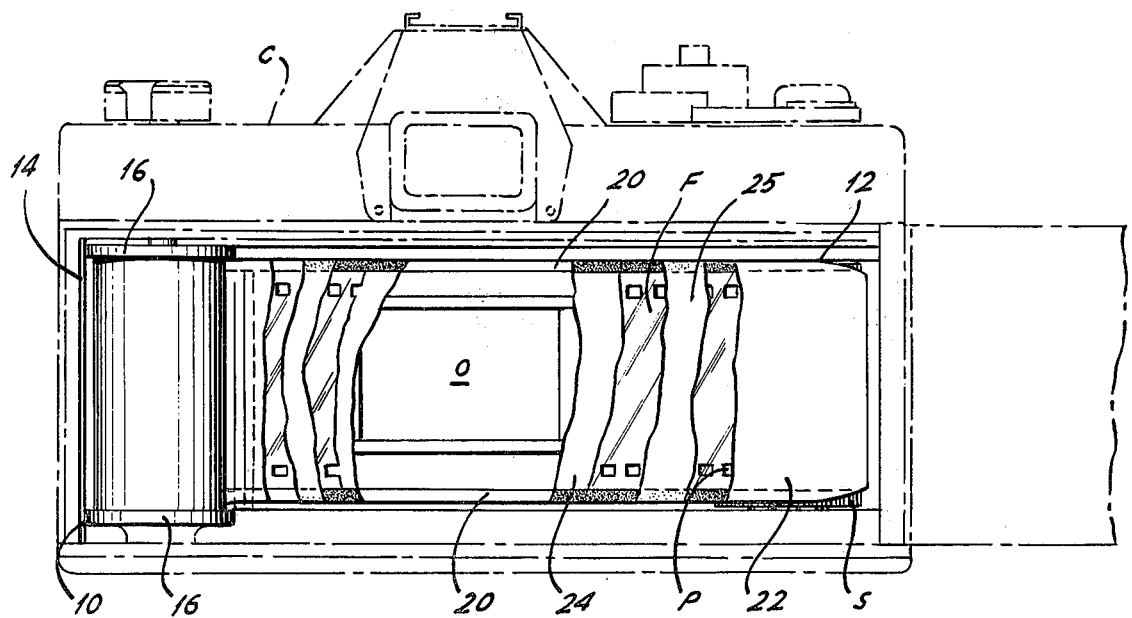
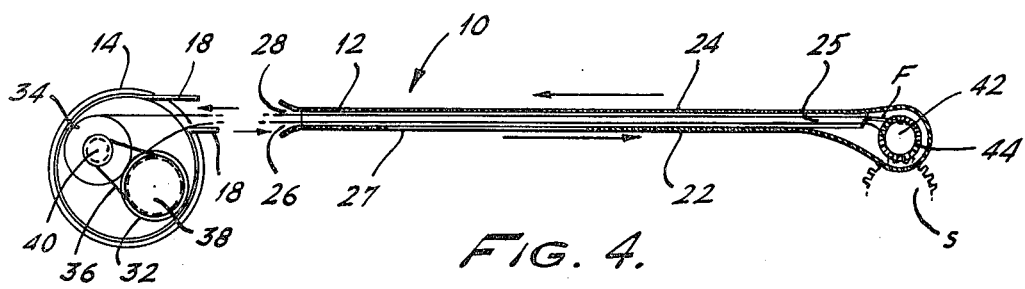

FILM CARTRIDGE

This invention relates to film cartridges and, more particularly, to film cartridges useable with cameras of the type wherein a precise length of film is fed across the shutter opening by a manual or automatic advance mechanism.

With some cameras, for example, 35 mm cameras, there is a film advance mechanism that feeds a precise length of film across the shutter opening after a picture is taken. The advance mechanism is either manually or automatically operated so that the camera is ready to take another picture. Usually, these cameras include a socket at one end in which a supply spool of unused film is located. At the other end of the camera is a take-up spool fixed in the camera housing and formed with drive means, for example, teeth that engage apertures along the edge of the film. Normally, the driver spool is driven by the associated advance mechanism in the camera so that a precise length of film is pulled from the supply spool across the shutter opening and around the take-up spool. With these arrangements, the taking of another picture is facilitated.

In loading these type cameras, it is usual to place the supply spool in the socket, pull the leading edge of the film from the spool across the shutter opening and to thread it onto the take-up spool. Thereupon, the take-up spool is wound slightly to insure that the film is tightly secured. Thus, a series of time-consuming steps are required to load the camera. Moreover, depending on the circumstances, for example, the skill of the operator and/or the conditions in which he is working, the loading of the camera can be difficult. Unloading cameras of this type is similarly time-consuming and can also be difficult. To unload these cameras, it is usually necessary to rewind all of the used film from the take-up spool back onto the supply spool and afterwards to remove the original supply spool from the camera.

From the foregoing description of the difficulties in loading and unloading these cameras it can be seen that a simplified technique and arrangement is desirable. In addition to having the cost of the alternative arrangement as low as possible, it is also desirable that the new arrangement be such that no modification to the cameras is necessary. Thus, the users of the alternative arrangements can use them with existing cameras at no additional expense.

Accordingly, it is a primary object of this invention to provide a film cartridge useable with cameras of the type that feed a precise amount of film across the shutter opening that facilitates the loading and unloading of these cameras.

It is another object of this invention to provide a film cartridge that requires no rewinding of the film to unload the camera.

It is still another object of this invention to provide a film cartridge useable with a 35 mm type of camera that does not require any modification or change to existing camera equipment.

Finally, it is an object of this invention to provide a film cartridge that is relatively simple and economical to make and use and that can be used with existing camera equipment.

These and other objects of this invention are accomplished by providing a film cartridge including a generally elongated flat housing portion having a first film pathway along one side and a second film pathway along the other side, and a generally cylindrical housing portion at one end thereof. A film feed spool and a film take-up spool are rotatably arranged in side-by-side relationship inside the cylindrical housing portion with driving means between the spools so that rotation of one causes rotation of the other. At the other end of the flat housing portion is a roller formed with means that cooperate with a film advance mechanism for driving the film so that the film is pulled from the feed spool along the first pathway around the roller and along the second pathway to the take-up spool where it is rewound. An aperture is associated with the flat section along one pathway so that film can be exposed to the shutter aperture for taking pictures in the usual way.

It has been found highly desirable to utilize an endless belt between the supply and take-up spools for driving them in unison and it has been found particularly desirable to form the spools with hubs and to have the diameter of the hub on the feed spool be about three to three and one-half times the diameter of the hub on the take-up spool. It has also been found preferable to have the elongated portion connected to the cylindrical portion to allow relative movement for adjusting the location of the aperture with respect to the shutter opening.

For a better understanding of the invention, reference is made to the following description of a preferred embodiment thereof, taken in conjunction with the figures of the accompanying drawing, in which:

FIG. 1 is a perspective view of a film cartridge in accordance with this invention;

FIG. 2 is an enlarged view of a roller member useable with the cartridge of this invention with portions of the film broken away for the sake of clarity;

FIG. 3 is a view of the film cartridge illustrated in FIG. 1 seen in a camera with which it is useable; and, FIG. 4 is a section view of the cartridge illustrated in FIG. 1 and taken along the longitudinal axis.

Referring now to the drawing, there is illustrated a film cartridge 10 in accordance with this invention that includes a generally flat elongated portion 12 and a generally cylindrical housing portion 14 located at one end of the flat portion. The cartridge can be made of any suitable light-weight, rugged material such as a thermoplastic resin and is arranged so that it is generally light-tight. The cylindrical housing portion is formed with end plates 16,16 and with a pair of adjacent lips 18,18 and in the preferred embodiment disclosed herein, elongated portion 12 is frictionally retained therebetween so that the elongated portion can be moved relative to the cylindrical portion 14 to accommodate for variations in the dimensions of the diverse available cameras, as will be explained hereinafter.

The elongated portion 12 can be formed with a pair of side rib members 20,20 and with outer surfaces 22 and 24 extending therebetween. A central spine or divider 25 located between the surfaces 22 and 24 and cooperates with those surfaces to provide a first pathway 26 for the film F and a second pathway 28 opposite and parallel to the first. As best seen in FIG. 2, the rib members 20,20 can be in the shape of an I-Beam to provide rigidity and to form side guides for the film F. The outer surface 22 is formed with an opening 27 of a size approximating that of a shutter opening so that the film is exposed to it when taking a picture.

Within the cylindrical housing portion 14 there is rotatably arranged in side-by-side relationship a film feed spool 32 and a film take-up spool 34. Normally, the film feed spool 32 includes the unused film F which then extends along the first pathway 26 around the opposite end of the elongated portion 12, back along the second pathway 28 to the take-up spool 34. Associated with the spools 32 and 34 is driver means such that rotation of one causes rotation of the other. In the preferred embodiment of the invention disclosed herein this driver means comprises an endless belt 36 in the form of a rubber O-ring. One end of feed spool 32 is formed with a hub 38 and one end of take-up spool 34 is formed with a hub 40. The belt 36 extends around the hubs 38 and 40 and grips them so that rotation of one hub causes rotation of the other along with their associated spools. Use of the belt arrangement is preferred because it allows for some slippage of the take-up spool 34 relative to the feed spool 32. This slippage is important when the camera is first loaded and the velocity of the film from the feed spool 32 exceeds that of the film on the take-up spool 34. For the same reason, the diameter of the hub 38 is larger than the diameter of the hub 40 so that the take-up spool 34 rotates faster than the feed spool 32. It has been found that diameter of the hub 38 should be about three to three and one-half times larger than that of hub 40. Since the take-up spool 34 rotates faster than the feed spool 32, the film can be wound on the take-up spool, despite the fact that the film velocity from the feed spool is greater than that on the take-up spool.

At the end of the elongated portion 12 opposite the cylindrical portion 14 there is provided a roller 42 as best seen in FIG. 2 of the drawing. The roller 42 includes two enlarged cylindrical sections joined by a reduced diameter central section. Adjacent the free ends of the enlarged sections are formed a plurality of open-ended slots 44 of a size approximately equal that of perforations P along the edges of the film F. The slots 44 and perforations P are engaged by teeth on a drive spool S in the advance mechanism associated with the camera as seen in FIGS. 3 and 4. The advance mechanism can be any conventional type utilized with existing cameras for driving a precise length of film across the shutter opening so that the next exposure is available for taking a picture immediately after a picture is taken. As the film is driven by the advance mechanism, the film is pulled off of the feed spool 32 causing it to rotate and this rotation, in turn, drives the take-up spool 34 through the belt 36. Rotation of the take-up spool pulls the film F causing it to wind around itself. Thus, the film travels from the feed spool 32, along the pathway 26, around the roller 42, along the pathway 28 and onto the take-up spool 34.

Adjacent the roller 42 is a guide finger 46 which guides the film F from the first pathway 26 to the second pathway 28 along a radius sufficient to assure that at least two to three of the perforations P are engaged by teeth to insure positive drive. If desired the edge of the divider 25 can be formed with fingers (not shown) forming a clip engaging the reduced diameter portion of the roller 42 for holding it against axial movement and for retaining it in position.

From the preceding description, it can be seen that the film cartridge 10 can be placed into a camera C with the cylindrical portion 14 lying in the normal feeding cavity and with the elongated flat portion 12 overlying the shutter opening O of the camera. It can also be seen that the roller 42 is arranged adjacent that driving spool S forming part of the advance mechanism associated with the camera so that teeth thereof engage the slots 44 and perforations P in the film. In placing the cylindrical section 14 in the socket, there is a precise location for receiving the end plates 16,16 and holding the cylindrical portion in place. The flat elongated portion 12 may be moved between the lips 18,18 so that the position of the film pathways and the aperture 27 can be adjusted to fit precisely in the camera. As seen in FIG. 4, the flat elongated portion 12 can be separated from the cylindrical portion 14, if necessary. It is noted that in normal commercially available cameras there is a variation of anywhere from 1/32" to ⅜" from the normal feeding cavity to the location of the shutter opening. The flat portion 12 is further adjusted when placed in the camera to assure that the teeth on the driving spool mechanism engage the slots 46 in the roller 42 and the perforations P. Once the cartridge 10 is located the back coverplate (not shown) of the camera is locked in place and the usual pressure plate holds the flat elongated portion 12 in place. Thus, the loading and unloading of the camera is greatly simplified and there is no need for rewinding the film during the unloading procedure. In addition, no modification to existing camera equipment is required.

Once the cartridge 10 is loaded in the camera C, the driving of the driver spool, through the teeth thereon and the slots 44 and peforations P, pulls the film F off of the feed spool 32 along the first pathway 26 across the opening 27. As the feed spool 32 is driven by the film, it, of course, drives the take-up spool 34 through the endless belt 36 causing the film to be pulled around the roller 42 and guide finger 46, along the second pathway 28 to wind around the take-up spool. The film advance mechanism, of course, feeds a precise length of film from the feed spool so that the next exposure is located at the opening 27 for the taking of another picture.

While in the foregoing there has been described a preferred embodiment of the invention, it should be obvious that various changes and modifications can be made without departing from the true spirit and scope of the invention as recited in the appended claims.

I claim:

1. A film cartridge including a generally flat elongated portion having a first film pathway along one side and a second film pathway along the other side, one of said sides being formed with an opening for exposing a portion of film, a generally cylindrical portion at one end of said elongated portion, a film feed spool and a film take-up spool rotatably mounted in said cylindrical portion in side-by-side relationship, drive means between said spools so that rotation of one spool causes rotation of the other spool, roller means at the other end of said elongated portion adjacent the free ends of said pathway, said roller means having end portions adjacent the edges of the film and including driving means for cooperating with a film advance mechanism in a camera, guide means in the form of an arcuate member extending from said other end of said elongated portion and adjacent a portion of said roller means such that the film extends from said first pathway to said second pathway with the film in engagement with said arcuate member such that one edge is in engagement with said driving means whereby the film can be pulled from said feed spool along said first pathway causing rotation of said take-up spool so that the film can be pulled along said second pathway and wound on said take-up spool.

2. A film cartridge in accordance with claim 1 wherein said drive means comprises a first hub member on said film feed spool, a second hub member on said film take-up spool and an endless loop belt member extending around said hub members.

3. A film cartridge in accordance with claim 2 wherein the diameter of said first hub member is greater than the diameter of said second hub member so that said take-up spool rotates faster than said feed spool.

4. A film cartridge in accordance with claim 1 wherein said elongated portion is movable relative to said cylindrical portion for adjusting the location of said opening in a camera.

5. A film cartridge in accordance with claim 1 wherein said cylindrical portion is formed with a pair of lips which frictionally engage said one end of said elongated portion whereby said elongated portion is movable relative to said cylindrical portion.

6. A film cartridge in accordance with claim 1 wherein said opening in said elongated portion is located on said one side thereof.

7. A film cartridge in accordance with claim 1 wherein said means on said roller means comprises a plurality of slots formed adjacent each end thereof.

8. A film cartridge including a generally flat elongated portion and a generally cylindrical portion, said flat elongated portion comprising a divider member and a pair of outer walls on opposite sides thereof forming a first film pathway along one side and a second film pathway along the other side, an aperture formed in said outer wall forming said first film pathway for exposing a portion of film, said cylindrical portion being formed with a pair of lips that frictionally engage said outer walls at one end of said elongated portion whereby said elongated portion can be moved relative to said cylindrical portion, a film feed spool and a film take-up spool rotatably mounted in side-by-side relationship in said cylindrical portion, said film feed spool being adjacent said first pathway and said film take-up spool being adjacent said second pathway, said film feed spool being formed with a first hub member and said film take-up spool being formed with a second hub member, an endless belt member extending around said hub members whereby rotation of one spool causes rotation of the other spool, the diameter of said first hub member being greater than the diameter of said second hub member, and roller means located at the other end of said elongated portion adjacent the ends of said pathways, said roller means being formed with slots located adjacent the edges of the film, guide means extending adjacent said roller means in engagement with the film so that the edges of said film are in engagement with the slotted portion of said roller means whereby said slots are adapted to cooperate with an advance mechanism in a camera for pulling film from said film feed spool along said first film pathway, and for rotating said film feed spool causing rotation of said film take-up spool which pulls film around said roller means along said second film pathway and around said film take-up spool.

* * * * *